Figure 1:
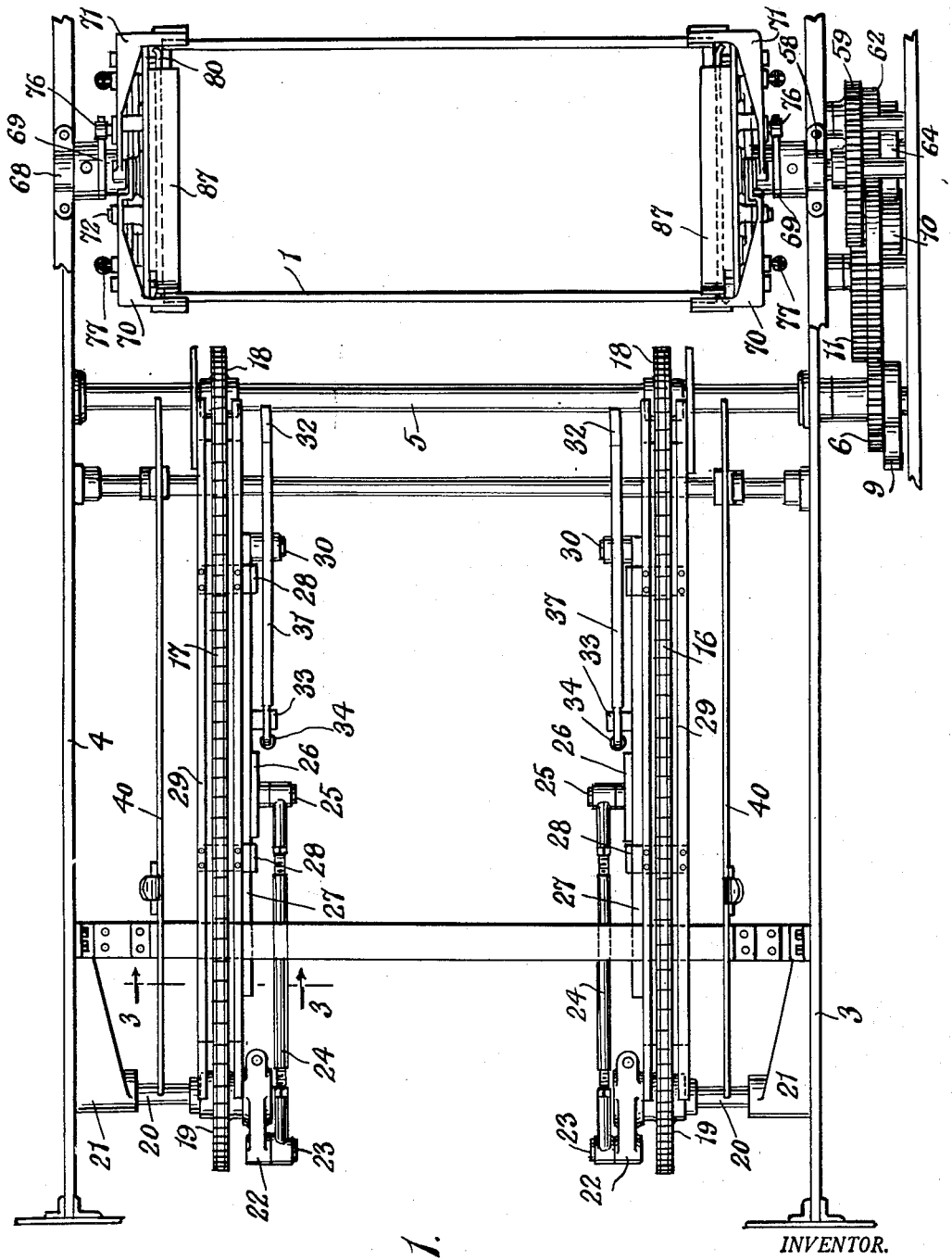

Jan. 26, 1954     G. S. PERKINS     2,667,281
TRAY DUMPING MECHANISM FOR CONFECTIONERY MACHINES
Filed June 17, 1950     4 Sheets-Sheet 1

INVENTOR.
George S. Perkins
BY
Harry Radzinsky
ATTORNEY

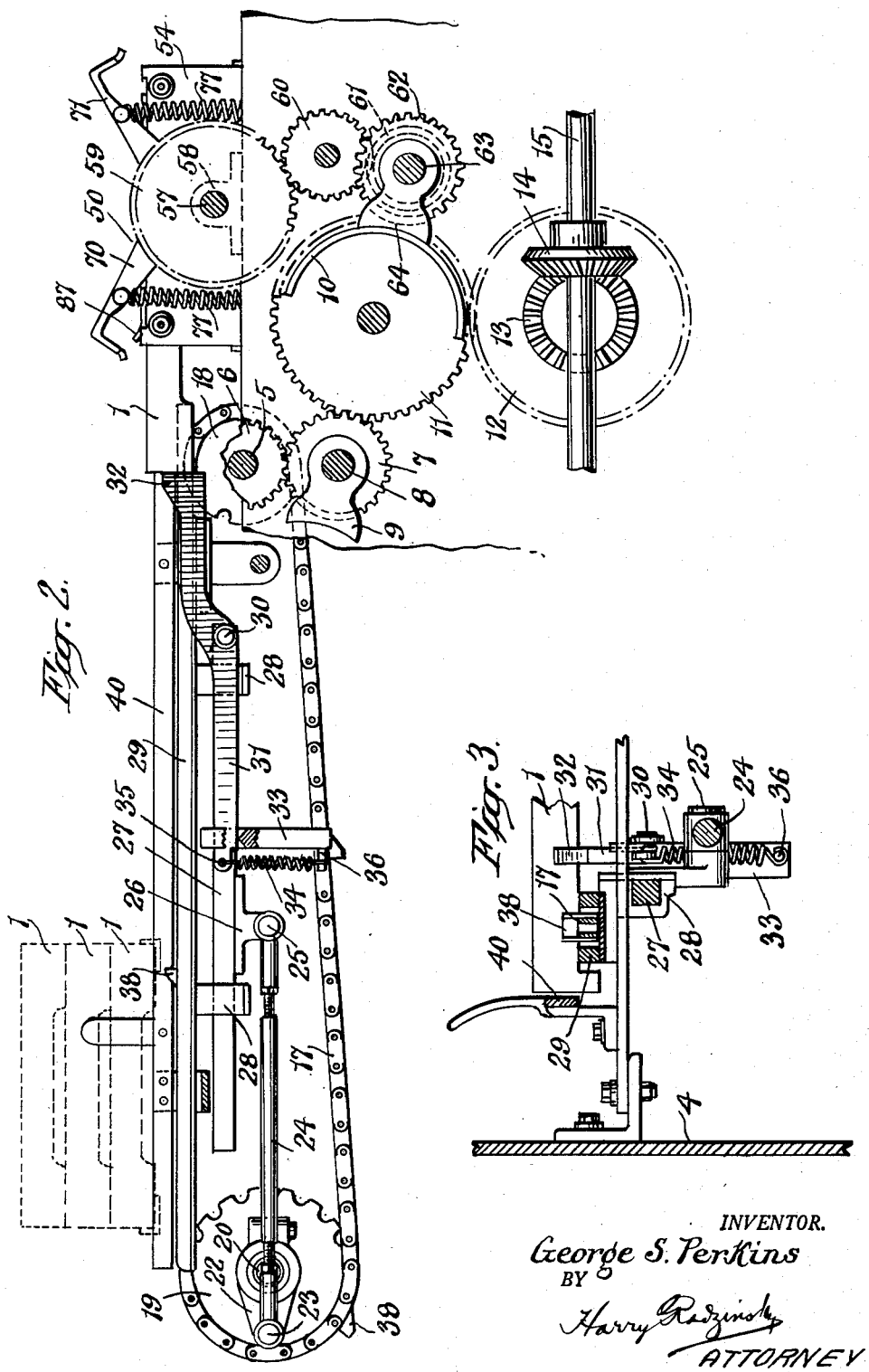

Jan. 26, 1954     G. S. PERKINS     2,667,281
TRAY DUMPING MECHANISM FOR CONFECTIONERY MACHINES
Filed June 17, 1950     4 Sheets-Sheet 3
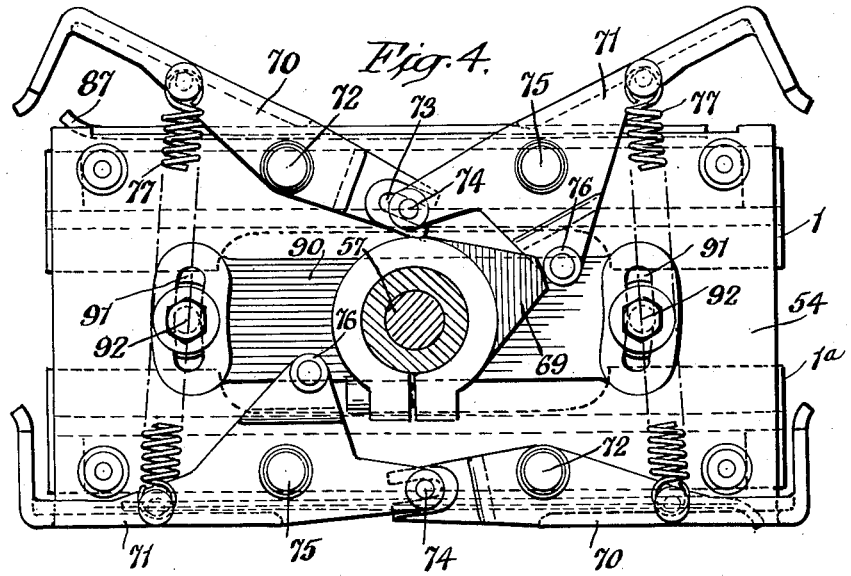
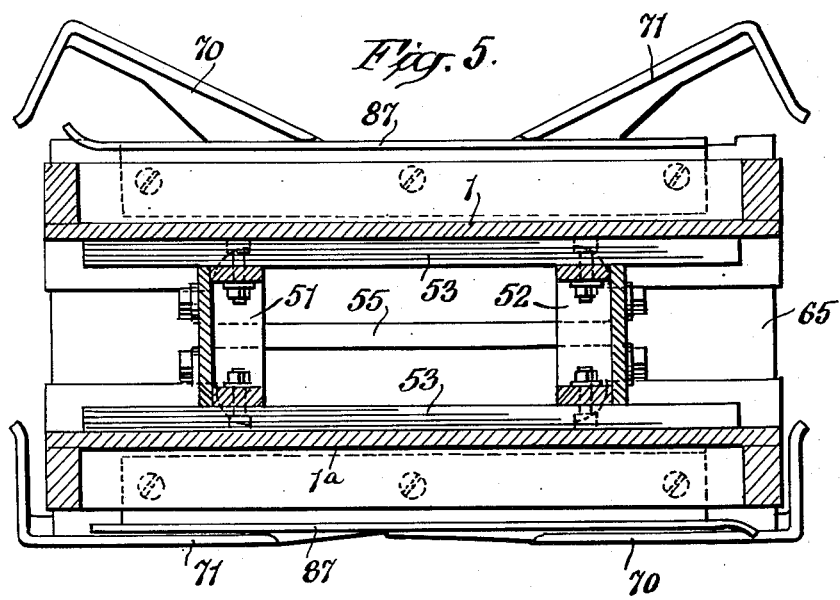
INVENTOR.
George S. Perkins
BY
Harry Radzinsky
ATTORNEY

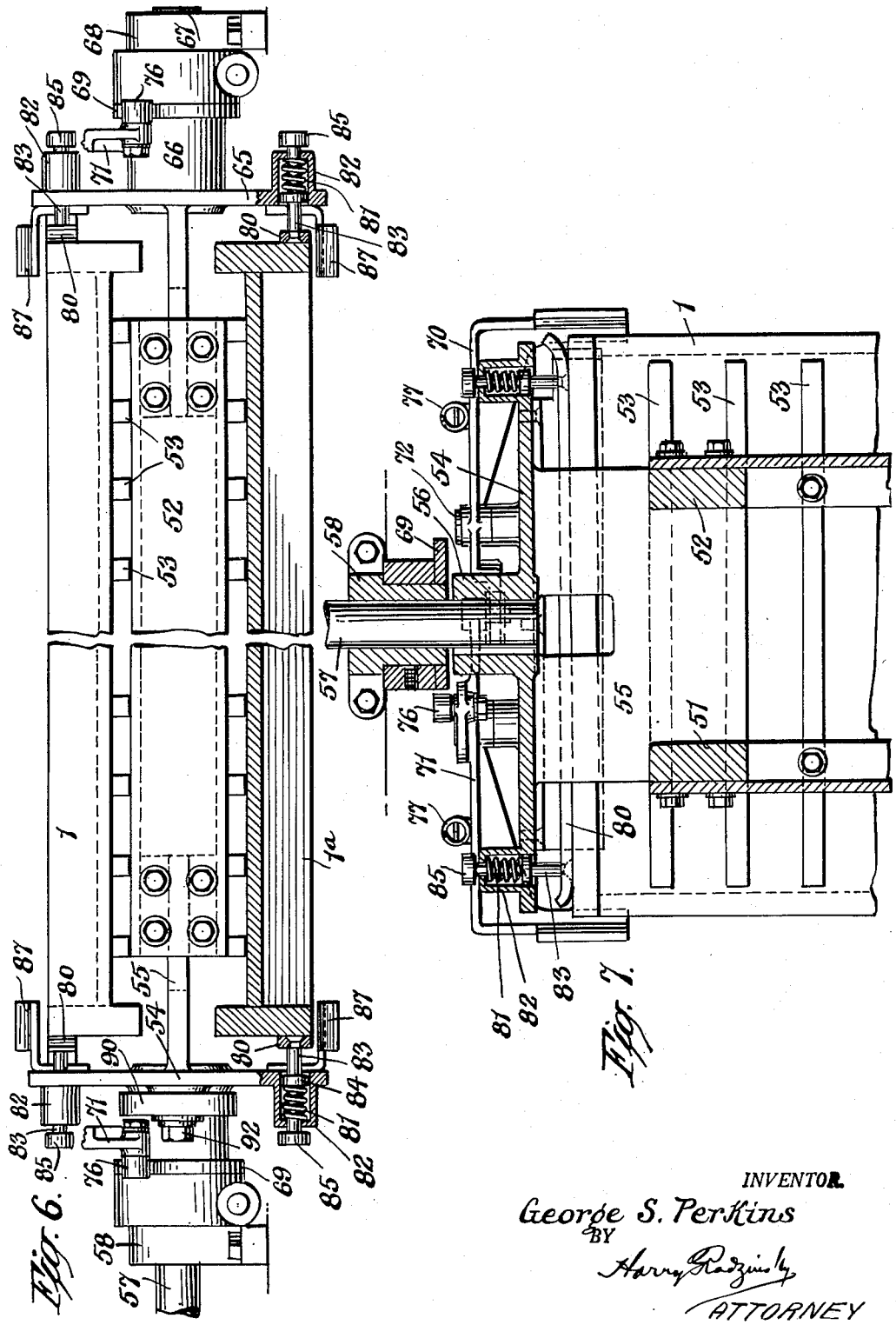

Patented Jan. 26, 1954

2,667,281

UNITED STATES PATENT OFFICE 2,667,281

TRAY DUMPING MECHANISM FOR
CONFECTIONARY MACHINES

George S. Perkins, New York, N. Y., assignor to
National Equipment Corporation, New York,
N. Y., a corporation of New York Application June 17, 1950, Serial No. 168,830

2 Claims. (Cl. 214—312)

1

This invention relates to confectionary machines, and more particularly to means by which trays or similar receptacles containing mold starch and candies molded therein, are dumped or emptied to permit the tray contents to be captured and the emptied tray made ready for reuse.

In certain types of candy-making machines, wooden trays containing mold starch, are carried along by conveying means to an imprinter which produces recesses or indentations in the starch to form the mold pockets. The tray carrying the recessed starch is next transported to a depositor which fills the mold recesses with the fluid candy. The candy is permitted to harden or set in the molds and a number of the filled trays are stacked at the inlet end of the candy-making machine, at which end the mold starch and candies are dumped out preparatory to refilling each tray with mold starch to begin its movement through the machine as above stated.

The present invention has particular reference to that portion of the machine by which the filled trays are successively removed from a bottom of a stack and are moved to position upon a rotatable dumper which normally holds two of the trays, one of which is directed upwardly while the second tray is directed downwardly or is being dumped or cleared of its contents. The invention further contemplates the provision of means by which the rotatable dumper is rotated intermittently and upon each of its movements is rotated for one half turn and during each pause in its rotative movement will have its emptied tray removed and a filled tray placed in position while a previously-placed tray is held in an inverted or dumping position and is being discharged of its contents.

Another object of the invention is to provide means by which successive trays are moved by a chain conveyor to position upon a dumper, with means supplemental to said conveyor for imparting a forward movement to the tray sufficient to accurately and positively seat the tray upon the dumper to be held thereby preparatory to being inverted by rotative movement of the dumper and thus discharged of its contents.

Still another object of the invention is to provide, in a machine of this character, means by which the dumping action of the filled trays is greatly facilitated, due in part to the fact that the discharge of the tray contents is attained while the tray is held in a directly inverted or upside-down position during a pause or halt in the rotative movement of the dumper and while such pause or halt is being utilized for the removal of a previously emptied tray and the replacement thereof by a filled tray.

2

With these and other objects to be hereinafter set forth, in view, I have devised the arrangement of parts to be disclosed and more particularly pointed out in the claims appended hereto.

In the accompanying drawing, wherein an illustrative embodiment of the invention is disclosed, Fig. 1 is a top plan view of the improved mechanism for feeding filled trays to a rotative dumping device which empties the same; Fig. 2 is a side elevation of the above mechanism, with some parts shown in section and others broken away to disclose construction; Fig. 3 is a sectional view taken on the line 3—3 of Fig. 1, looking in the direction of the arrows; Fig. 4 is an end view of the tray-dumper with parts in section; Fig. 5 is a vertical sectional view through the tray-dumper; Fig. 6 is a front elevation of the dumper showing two trays in place thereon, the lower tray, or that in dumping position, being shown in section, and Fig. 7 is a horizontal sectional view through one end of the dumper.

In a machine of the character of that to which the present invention relates, a plurality of trays, filled with the mold starch, and the candies which have hardened or set therein, are placed in stacked relation, a stack of such filled trays being shown in dotted lines at the left in Fig. 2. The trays in such stack and in various other views of the drawing, are indicated at 1. The trays are successively removed from the bottom of the stack and are carried to a dumping device which receives each tray and is rotated through one-half a turn to bring the tray carried by it to an inverted position to dump its starch and candy contents onto a suitable screen below the dumper. While a tray is thus being dumped or emptied, the tray on the dumper which was previously so emptied and is then at the top of the dumper, is being forced out of its position on the dumper and a filled tray substituted for it.

The usual means for successively removing the filled trays from the bottom of the stack and successively placing them on a chain conveyor for transference to dumping means is known in the art, being shown, for example, in Patent No. 1,169,602 to Bausman, and possibly in other patents. The present invention relates particularly to the means which transfers the filled trays from the chain conveyor and to the novel dumping device to be hereinafter described.

Referring to Fig. 1, it will be noted that the frame of the machine includes the two longitudinal side members 3 and 4 having suitable bearings in which a cross shaft 5 is rotatively mounted, said shaft 5 operating the chain conveyor which carries the filled trays to the dumping device. Said shaft 5 is intermittently rotated by means of the gearing shown at the lower right in Fig. 1 and at the right in Fig. 2. Shaft 5 carries a gear 6, in mesh with a gear 7, on a shaft 8, said shaft 8 carrying a shoe 9 adapted to ride against the arcuate segment 10 of an interrupted driven gear 11 during each rotation of the gear 11, at which the shaft 5 will remain stationary and hence the chain conveyor will be idle and will not move a tray forwardly. Gear 11 has a completely toothed portion in constant mesh with a gear 12 carrying a bevel gear 13 in mesh with a bevel gear 14 secured on the continuously rotated drive shaft 15 extending from the source of power for the machine. It will be obvious that through the mechanism described, the chain conveyor will be moved intermittently and in properly timed relation to the movements of the dumper, generally indicated at 50, and to be shortly described.

The chains constituting the conveying means for the filled trays are respectively shown at 16 and 17, and the same each extend over a sprocket 18 secured on the shaft 5. At the forward or left end of the machine, chain 17 extends around a sprocket 19 rotative on a short shaft 20 secured in the bracket 21. A crank arm 22 connected to sprocket 19 is rotative on shaft 20 and has a pin 23 on which is pivoted one end of an adjustable link 24. The opposite end of the link 24 is pivotally attached at 25 to a bracket 26 secured to a slide bar 27. Said slide bar is supported and guided by brackets 28 extending downwardly from one of the rails 29 on which the conveyor chain 17 is supported. Pivotally mounted at 30 at one end of the slide bar 27 is a pusher 31 which is arranged to engage against the end of a tray as the tray leaves the chain conveyor and push it toward the right, as seen in Fig. 2, to cause the tray to be placed in proper position of rest on the top of the dumper 50 preparatory to being turned upside down and emptied of its contents by a half turn of the dumper. The forward end of the pusher 31, or that end which engages against the tray, is indicated at 32. At its opposite end, the pusher 31 extends through a guide 33 extending downwardly from the slide bar 27, said guide permitting the pusher to have a slight downward pivotal movement on its pivot 30 under the weight of a tray riding over the end portion 32. The end portion 32 of the pusher is normally held in a slightly elevated position, or that shown in Fig. 2, by means of a coil spring 34 having one end attached at 35 to the rear end of the pusher 31, and having its other end attached to a pin 36 at the lower end of the guide bracket 33.

A pusher 37, similar to that shown at 31 is employed to operate in company with the pusher 31 and the support and driving means for pusher 37 is similar to that just described, in connection with pusher 31. Similar reference characters to those used in connection with pusher 31 and its associated parts, are therefore used for the elements which operate the pusher 37.

The two chains 16 and 17 are provided with lugs 38 at properly-spaced positions on the chains, and a pair of these lugs carried by the two chains, engages behind each tray 1, and moves the tray along the supporting rails 29 toward the right and toward the dumper generally indicated at 50. The pivotal mounting at the points 30 of each of the pushers 31 and 37 permits these pushers to be depressed by each of the trays as the trays pass over them on travel toward the dumper. When each tray passes beyond the ends 32 of the pushers, and while these pushers are in their retracted positions or are drawn toward the left as in Figs. 1 and 2, the ends 32 of the pushers will rise under the pull of the springs 34 and engage behind the tray 1 as shown in Fig. 2. Then rotation of the cranks 22 will cause the slide bars 27 and the pushers 31 and 37 connected thereto to be moved toward the right and cause the tray to be pushed in that direction and to an extent required to move the full tray to a position of rest on the top of the dumper 50. As said tray is moved into position on the dumper, it will engage against the rear wall of the previously emptied tray then resting on the top of the dumper, and will push said emptied tray from off the dumper and onto a suitable conveyor where it will be carried to a refilling station to receive the mold starch. On their movements along the supporting rails 29, the trays are guided by guide rails shown at 40.

The dumper, generally indicated at 50, is shown in detail in Figs. 4 to 7 inclusive. It will be therein noted that the same includes a frame having a pair of channel members 51 and 52 across which a plurality of spaced cross bars 53 constituting tray supports, are attached. One end member of the dumper is shown at 54 and the same has a horizontally-extending plate portion 55 secured between the members 51 and 52 of the frame of the dumper. Said end member 54 is provided with a hub portion 56 loose on the shaft 57, said shaft being rotative in the bearing 58 on the frame of the machine. Secured on the shaft 57 is a plate 90 provided near each end with an arcuate slot 91. Bolts 92 extend through the slots 91 and attach the end member 54 to the plate 90. This arrangement is such that the entire frame of the dumper can be adjusted or leveled to insure it being positioned perfectly horizontally at each pause in the intermittent rotative movement of the dumpers. The shaft 57 carries a gear 59 in mesh with a small gear 60 meshing with a gear 61 on a shaft 63 which shaft carries a gear 62 and a shoe 64, said shoe being operative at predetermined times against the arcuate segment 10 on gear 11. This interrupted drive arrangement is such that when the conveyor is feeding a tray to the dumper, the dumper is in its position of halt; the bottom tray in the dumper is at that time being emptied of its contents, and the empty tray at the top of the dumper is being pushed from off the same and a filled tray is being placed in position.

The opposite end member of the dumper is shown at 65 and the same is similar to that shown at 54. End member 65 has a hub 66 on shaft 67 rotatively supported in bearing 68. Secured on each of the bearings 58 and 68 is a stationary cam 69 which causes opening movements of tray-holding clamps 70 and 71. These clamps are arranged in two pairs at each end of the dumper. Clamp 70 is pivoted at 72 to one of the ends of the dumper frame. At one end the clamp is slotted as at 73, to receive the pin 74 at the end of the clamp 71. Clamp 71 is pivoted at 75 and carries a roller 76 which, on rotation of the dumper and at the proper time, reaches the peak of the cam 69 and is caused to pivot to raise its free end. Through the described toggle connection of the clamp 71 with its companion clamp 70, clamp 70 will be also caused to pivot to open position. This opening movement of the clamps 70 and 71 occurs only when the clamps affected by the cams are at the top of the damper or as seen in Fig. 4. The clamps are connected by the coil springs 77 as clearly seen in Fig. 4, to normally hold them closed.

When a tray is slid into position on the top of the dumper, it is aligned thereon by being inserted between two spring-mounted shoes 80, which resiliently engage against the side walls of the tray as clearly seen at the bottom of Fig. 6. These shoes 80 are urged inwardly or toward the side walls of the tray to a limited extent by means of coil springs 81 contained in cups 82 provided on the end members 54 and 65 of the dumper. Said springs 81 each surround a pin 83 extending from the shoe 80, which pin carries a collar 84 and a head 85 to respectively maintain the spring and limit the extent of inward movement of the shoe. Upper guide plates 87 are also used on the dumper to prevent rising movement of the tray while the clamps are in raised position and while one tray is being slid from off the dumper and a filled tray is being moved into its place.

From the foregoing, the operation of the improved tray-dumping or emptying means will be readily understood. Filled trays, stacked as seen in dotted lines at 1 in Fig. 2, are successively removed from the bottom of the stack by any known means now in use for this purpose, and each tray so removed is engaged by a pair of lugs 38 on the chains 16 and 17 and the tray is moved thereby toward the right. The tray passing over the end portions 32 of the pushers 31 and 37 will depress these ends of the pushers because of the pivotal spring mountings previously described, and the tray will be then moved beyond the ends 32. The pushers will then have their ends 32 raised to bring the same behind the tray, or as shown in Fig. 2, and then the slide bars 27, carrying the pushers 31 and 37, will cause the pushers to be moved to the right to an extent sufficient to push the tray from off the chains 16 and 17 and seat the same on top of the dumper. The empty tray on the dumper will be engaged by the forward end of the tray that is being pushed by the pushers, and the empty tray will be forced from off the dumper and onto a suitable conveying means acting to carry it away from the dumper.

While a filled tray is being placed on the dumper as above described, the dumper is holding a second tray in a downwardly directed or emptying position, the same being that tray shown at 1a in Figs. 5 and 6. This downwardly-directed tray 1a is thus being emptied of its contents by gravity, the mold starch and candies thus falling down on a suitable screen or sieve provided below the dumper in the known manner. When a filled tray has been placed on top of the dumper, and this occurs while the upper clamps 70 and 71 are open as shown in Fig. 4, the upper clamps are then closed and the dumper makes a half turn. This rotative movement of the dumper brings the tray 1a, which is now emptied of its contents, uppermost and in upright position, while the filled tray is now directed downwardly and is dumping its contents. Just before this rotative movement of the dumper takes place, the pushers 31 and 37 have been retracted or drawn toward the left so that the dumper can move through its arc of rotation without collision with the pushers. The dumper then halts; the empty tray is pushed from off the dumper by the incoming filled tray, and the cycle is repeated.

Through the arrangement described, a tray is dumping or emptying its contents while the previously-emptied tray is being removed from the dumper and a filled tray inserted in its place. This takes place while the dumper is halted. As a result, the downwardly-directed tray obtains sufficient time to fully and completely empty its contents by gravitational descent. The speed of dumping is increased and production greatly speeded up.

While I have herein shown one embodiment of the invention, it is obvious that the same is not to be restricted thereto, but is broad enough to cover all structures coming within the scope of the annexed claims.

What I claim is:

1. In a confectionary machine, a rotative tray-dumping device, conveying means for moving successive trays thereto, said dumping device having a pivot extending transversely to the direction of movement of the trays by the conveying means, the dumping device including a tray-support on which one tray is maintained in an upwardly-disposed position and another in an inverted dumping position, aligning means for the trays while on the dumping device comprising spring-pressed shoes between which each tray is positioned while on the tray-support, clamping means for holding the trays on the support comprising upper and lower pairs of pivoted clamping fingers engaging over the tops of the trays, and cam means for causing release of the upper pair of clamping fingers while the lower pair of fingers is maintained in clamping engagement with the inverted tray on the tray-support.

2. In a confectionary machine, a rotative tray-dumping device, conveying means for moving successive trays thereto, said conveying means including a pair of parallel chains, the dumping device having a pivot extending transversely of the direction of movement of the trays by the chains, the dumping device including a tray-support on which one tray is maintained in an upwardly-disposed position and another in an inverted dumping position, aligning means for the trays while on the dumping device comprising spring-pressed shoes positioned along the opposite sides of each tray while each tray is on the dumping device and resiliently centering the tray thereon, clamping means for holding the trays on the support comprising upper and lower pairs of pivoted clamping fingers engaging over the tops of the trays, cam means for causing release of the upper pair of clamping fingers while the lower pair of fingers is maintained in clamping engagement with the inverted tray on the support, and pushing elements located between the chains and operative to push successive trays onto the dumping device.

GEORGE S. PERKINS.

References Cited in the file of this patent

UNITED STATES PATENTS

| Number | Name | Date |
|---|---|---|
| 1,907,457 | Stevenson | May 9, 1933 |
| 1,967,719 | Morgan | July 24, 1934 |
| 2,157,642 | Vosler | May 9, 1939 |
| 2,160,581 | Behnke | May 30, 1939 |
| 2,162,336 | Johnstone | June 13, 1939 |
| 2,226,068 | Mosley et al. | Dec. 24, 1940 |
| 2,323,350 | Paynter | July 6, 1943 |
| 2,344,664 | Adams | Mar. 21, 1944 |
| 2,363,920 | Young et al. | Nov. 28, 1944 |
| 2,424,252 | Orlando | July 22, 1947 |
| 2,525,189 | Thomas | Oct. 10, 1950 |